US010237548B2

(12) United States Patent
Korneliussen et al.

(10) Patent No.: US 10,237,548 B2
(45) Date of Patent: Mar. 19, 2019

(54) VIDEO TRANSMISSION BASED ON INDEPENDENTLY ENCODED BACKGROUND UPDATES

(71) Applicant: Huddly AS, Oslo OT (NO)

(72) Inventors: Jan Tore Korneliussen, Oslo (NO); Anders Eikenes, Bekkestua (NO); Havard Pedersen Alstad, Oslo (NO); Stein Ove Eriksen, Oslo (NO); Eamonn Shaw, Gamle Fredriokstad (NO)

(73) Assignee: Huddly AS (NO)

( * ) Notice: Subject to any disclaimer, the term of this patent is extended or adjusted under 35 U.S.C. 154(b) by 206 days.

(21) Appl. No.: 15/004,316

(22) Filed: Jan. 22, 2016

(65) Prior Publication Data

US 2016/0219241 A1    Jul. 28, 2016

Related U.S. Application Data

(63) Continuation-in-part of application No. 14/603,212, filed on Jan. 22, 2015.

(51) Int. Cl.
*H04N 19/10* (2014.01)
*H04N 7/01* (2006.01)
*H04N 19/23* (2014.01)

(52) U.S. Cl.
CPC ........... *H04N 19/10* (2014.11); *H04N 7/0127* (2013.01); *H04N 19/23* (2014.11)

(58) Field of Classification Search
CPC ................................ H04N 5/38; G06T 19/006
See application file for complete search history.

(56) References Cited

U.S. PATENT DOCUMENTS

| | | | |
|---|---|---|---|
| 2002/0122570 A1* | 9/2002 | Paragios | G06K 9/00778 382/103 |
| 2008/0129844 A1* | 6/2008 | Cusack | H04N 5/232 348/241 |
| 2009/0060278 A1* | 3/2009 | Hassan-Shafique | G06K 9/00771 382/103 |
| 2009/0087024 A1* | 4/2009 | Eaton | G06K 9/00335 382/103 |

(Continued)

*Primary Examiner* — Jonathan R Messmore
(74) *Attorney, Agent, or Firm* — EdgeTech Law LLP

(57) ABSTRACT

Systems and methods are provided for alleviating bandwidth limitations of video transmission, enhancing the quality of videos at a receiver, and improving the VR/AR experience. In particular, an improved video transmission and rendering system is provided for generating high-resolution videos. The systems have therein a transmitter and a VR/AR receiver; the transmitter includes an outer encoder and a core encoder, while the receiver includes a core decoder and an outer decoder. The outer encoder is adapted to receive the video from a source and separately output a salient video and an encoded three-dimensional background, and the outer decoder is adapted to merge the background with the salient video thereby producing an augmented video. Also provided is a system that simulates pan-tilt-zoom (PTZ) operations without PTZ hardware. Further provided are methods for video transmission whereby a three-dimensional background model is generated, a background independently encoded, updated incrementally, and the background and the updates transmitted independently from the video.

12 Claims, 11 Drawing Sheets

System Overview

(56) References Cited

U.S. PATENT DOCUMENTS

2013/0342640 A1* 12/2013 Li .......................... H04N 7/15
348/14.13
2016/0259977 A1* 9/2016 Asbun .................... A61B 5/165

* cited by examiner

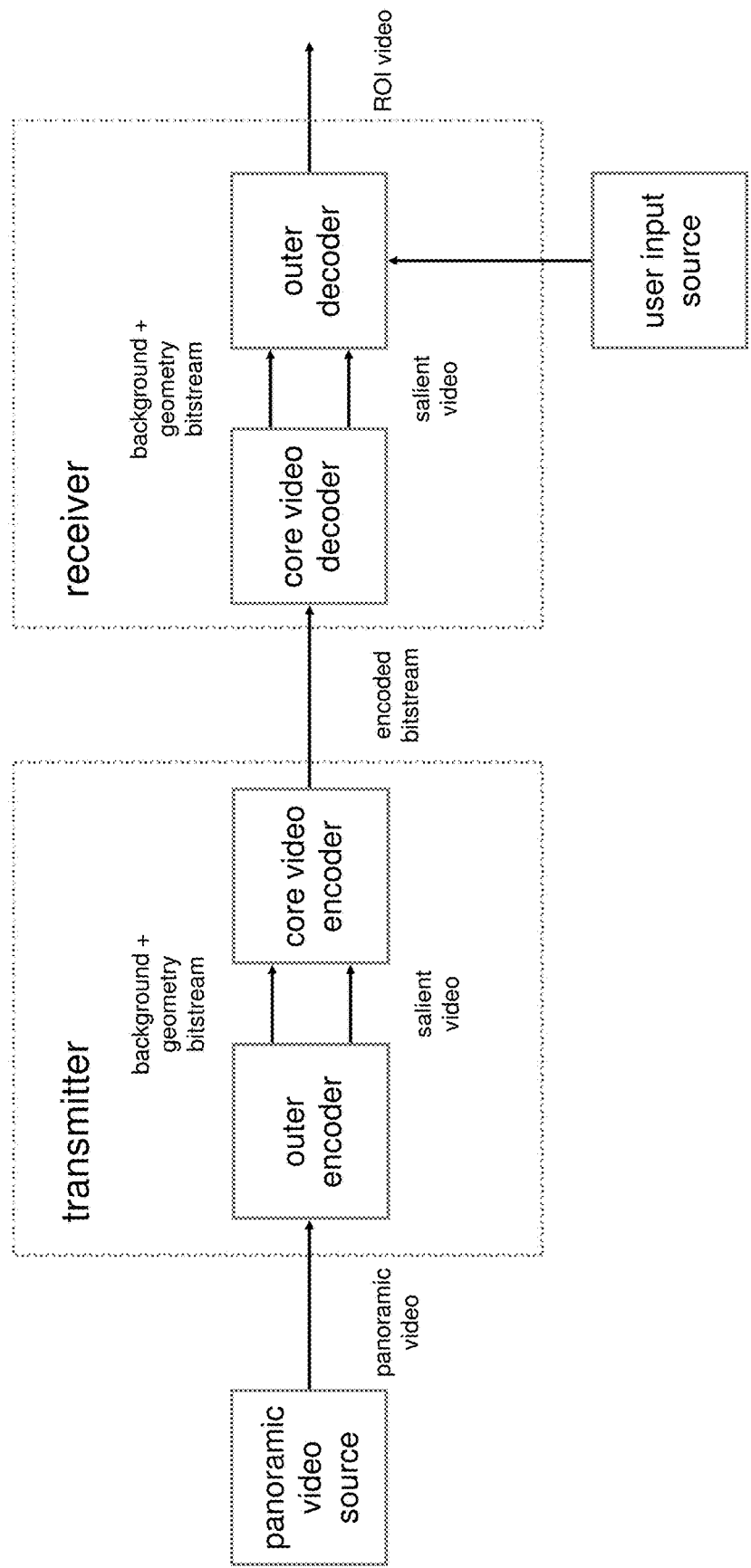
Figure 1: System Overview

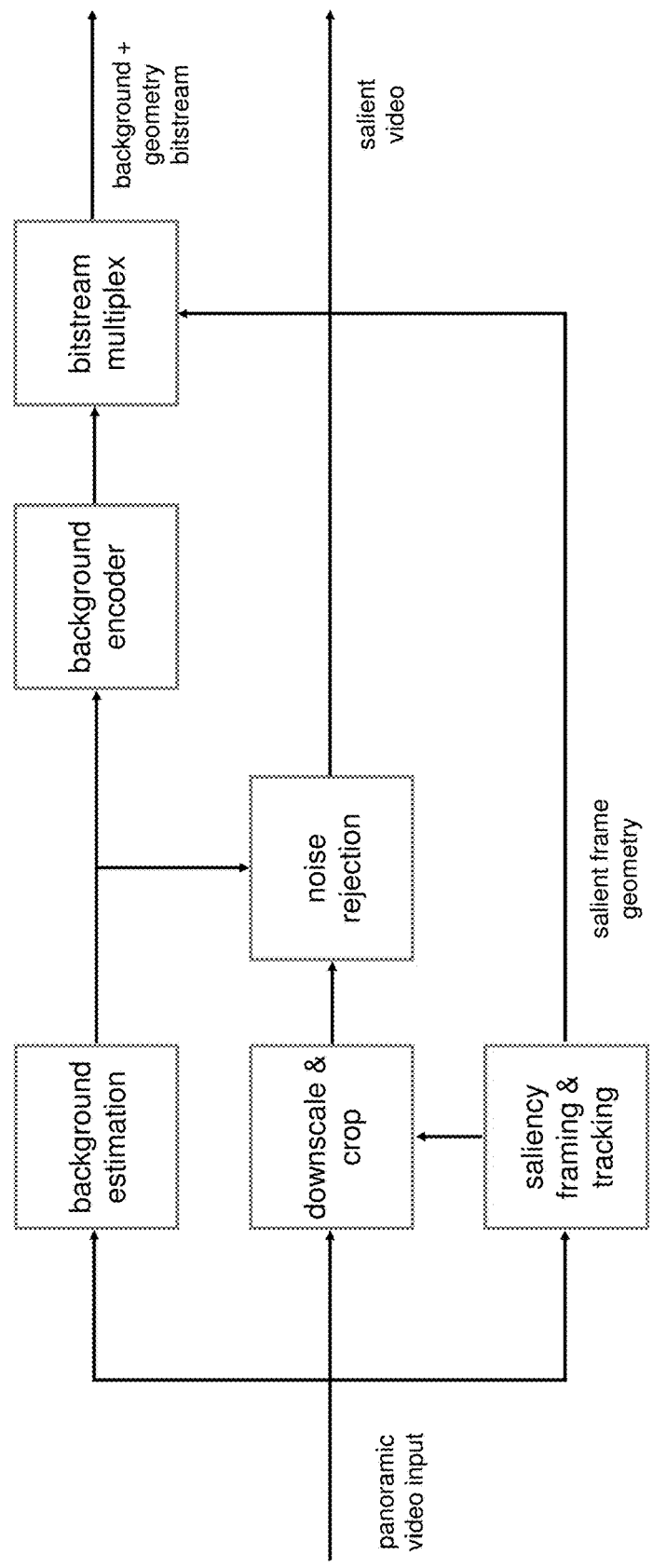

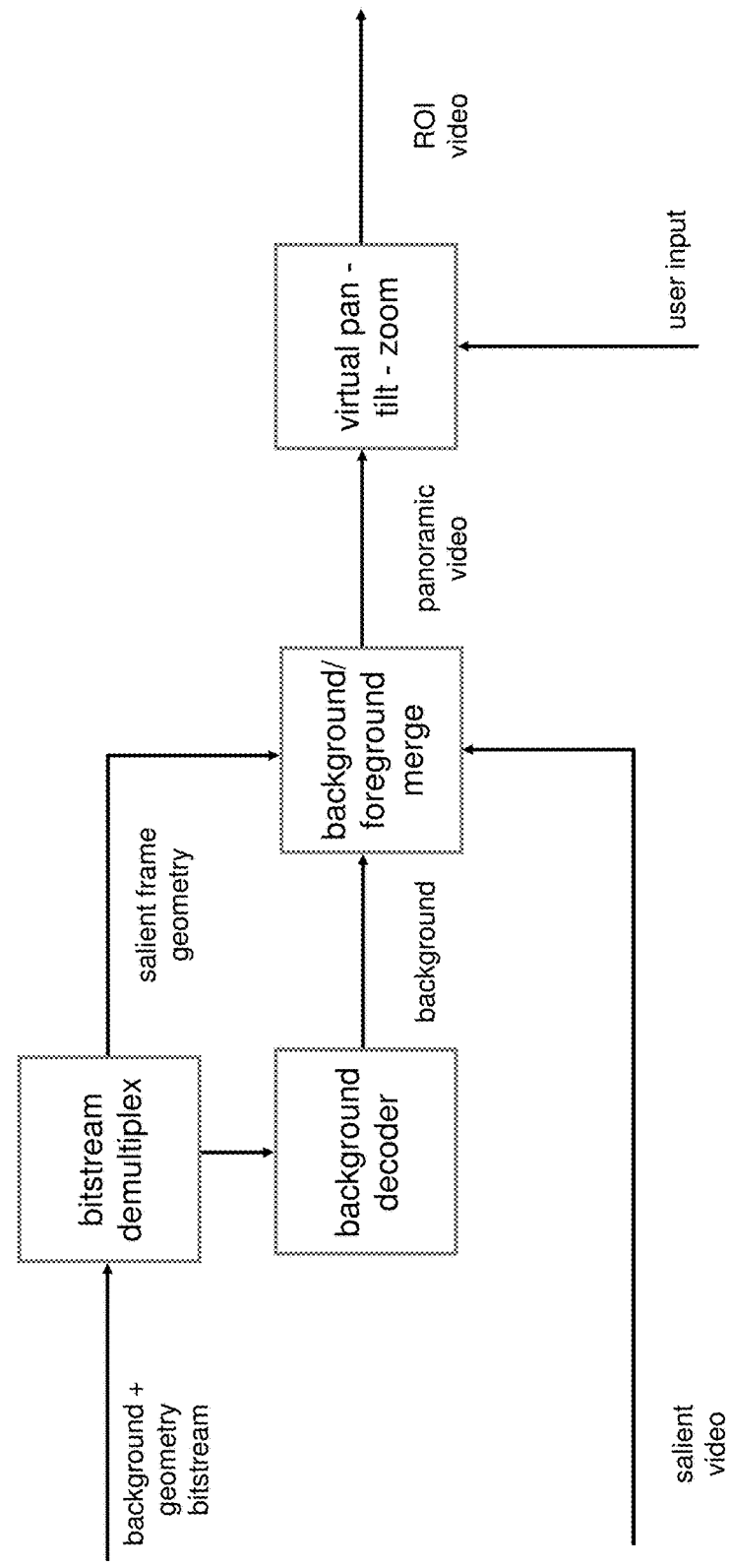
Figure 3: Outer Decoder

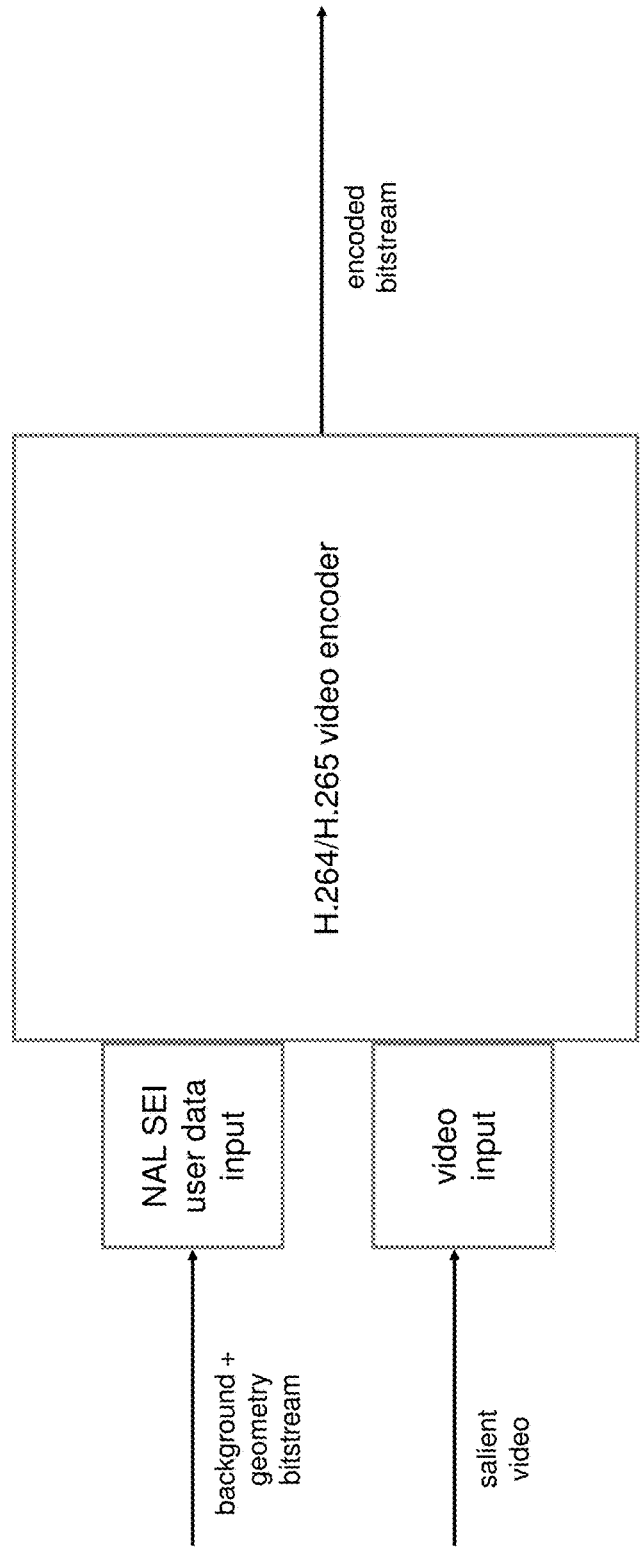
Figure 4: Core Encoder, H.264/H.265

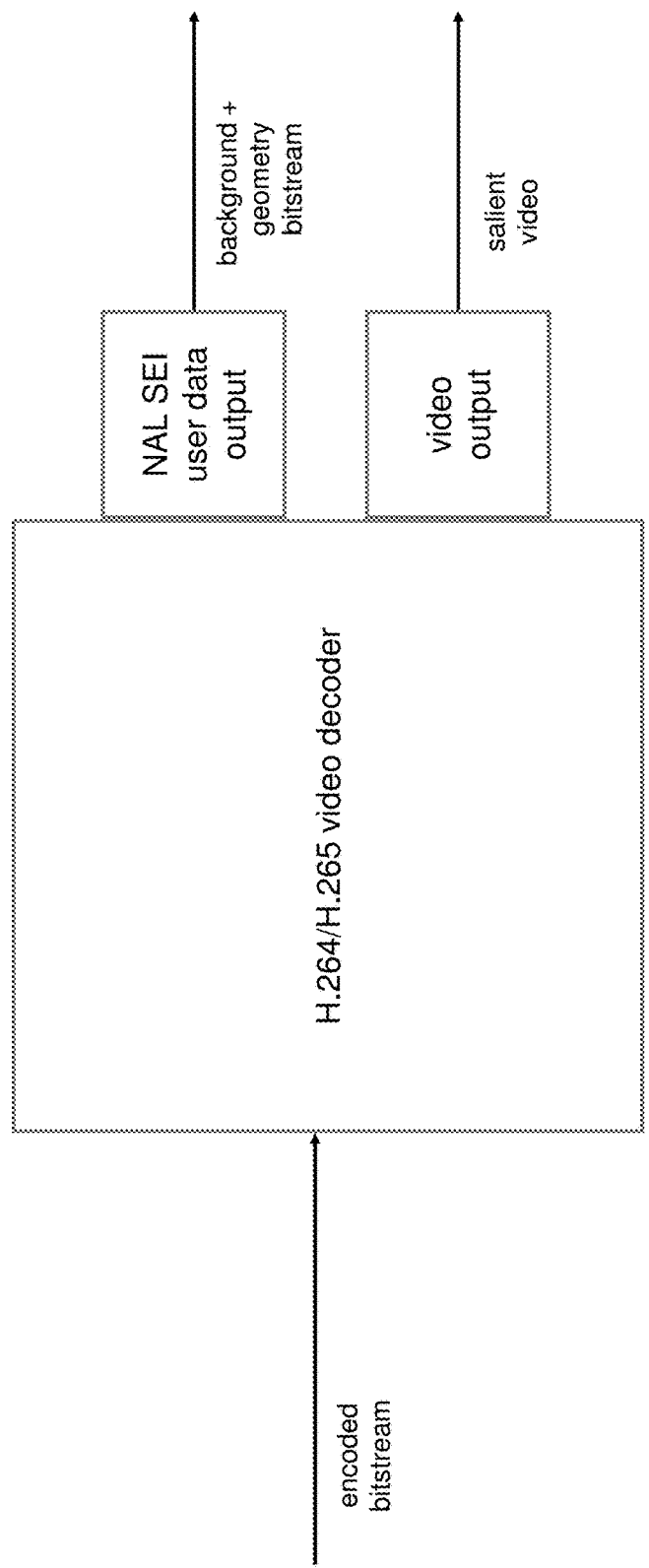
Figure 5: Core Decoder, H.264/H.265

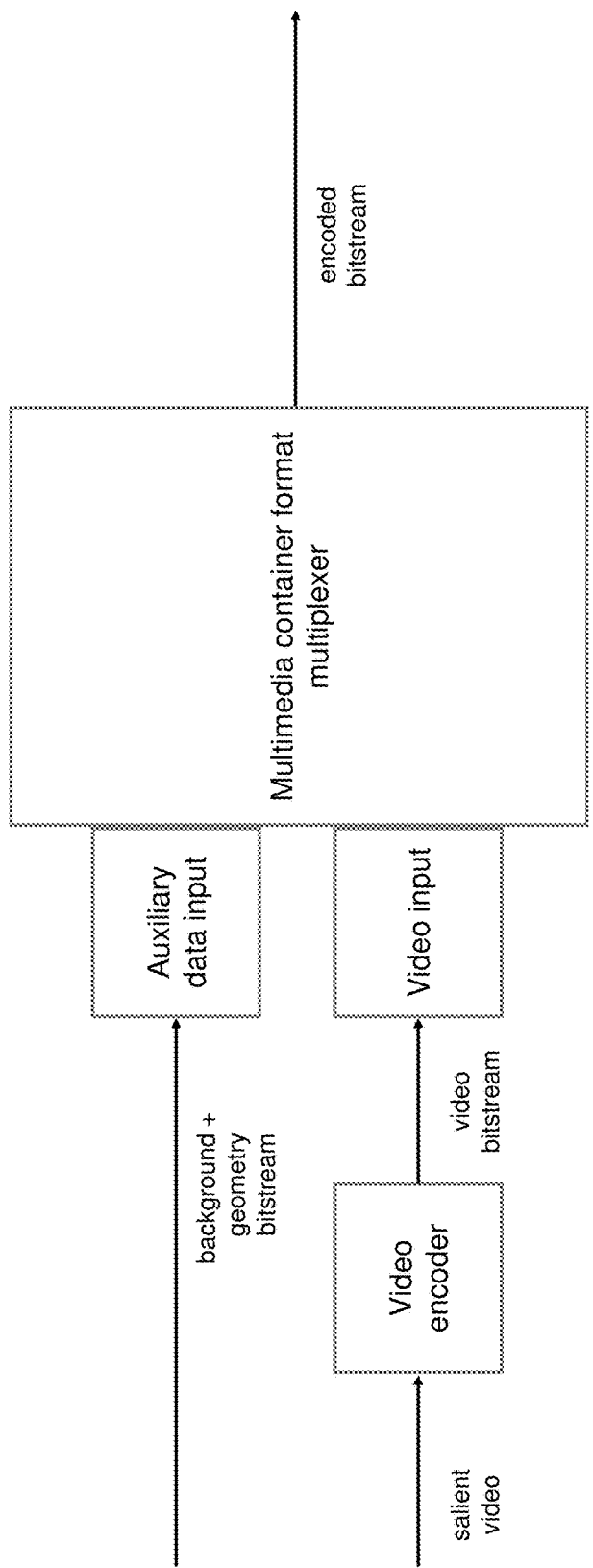
Figure 6: Core Encoder, Multimedia Container Format

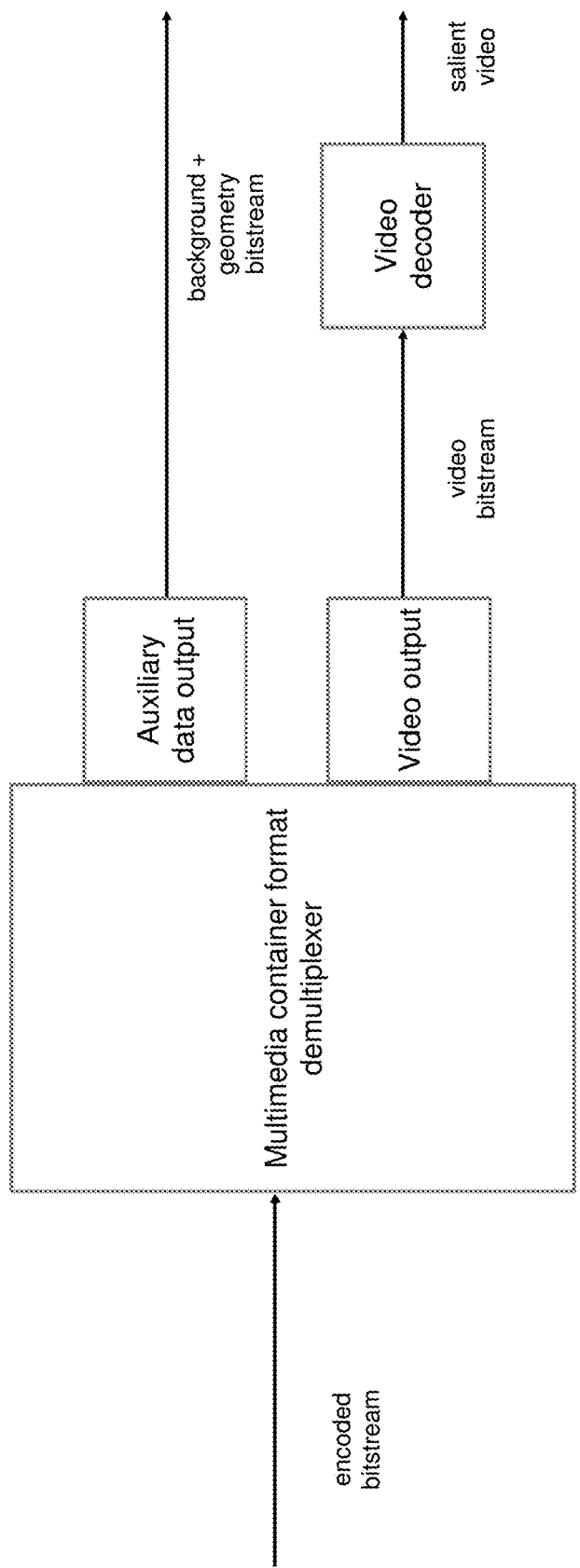
Figure 7: Core Decoder, Multimedia Container Format

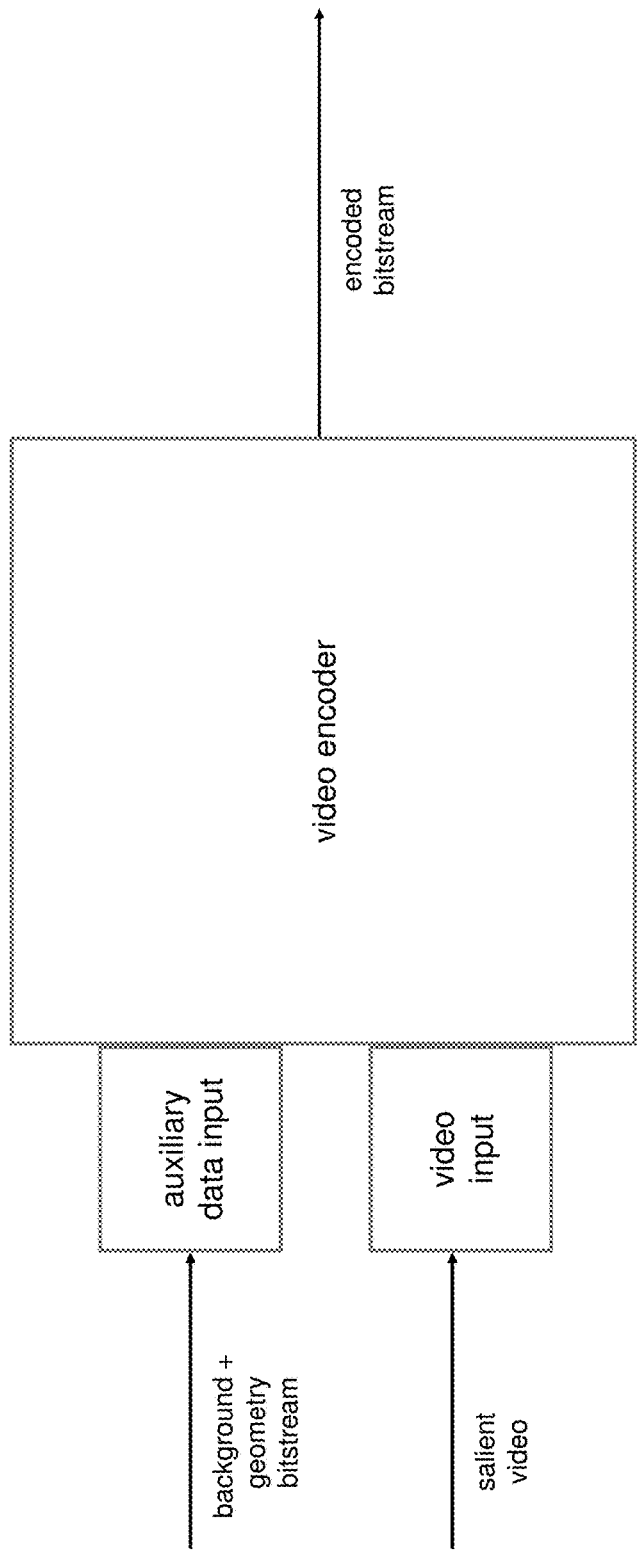

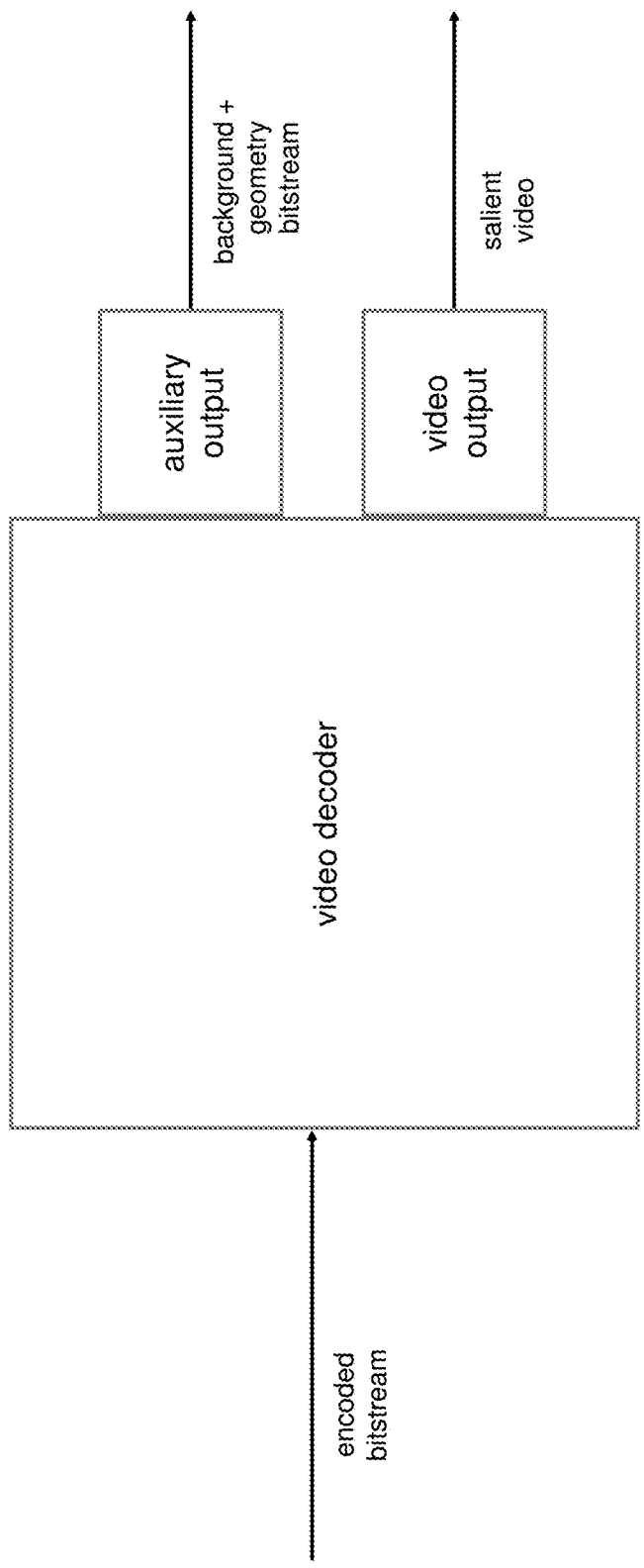
Figure 9: Core Decoder, Standard Video Encoder

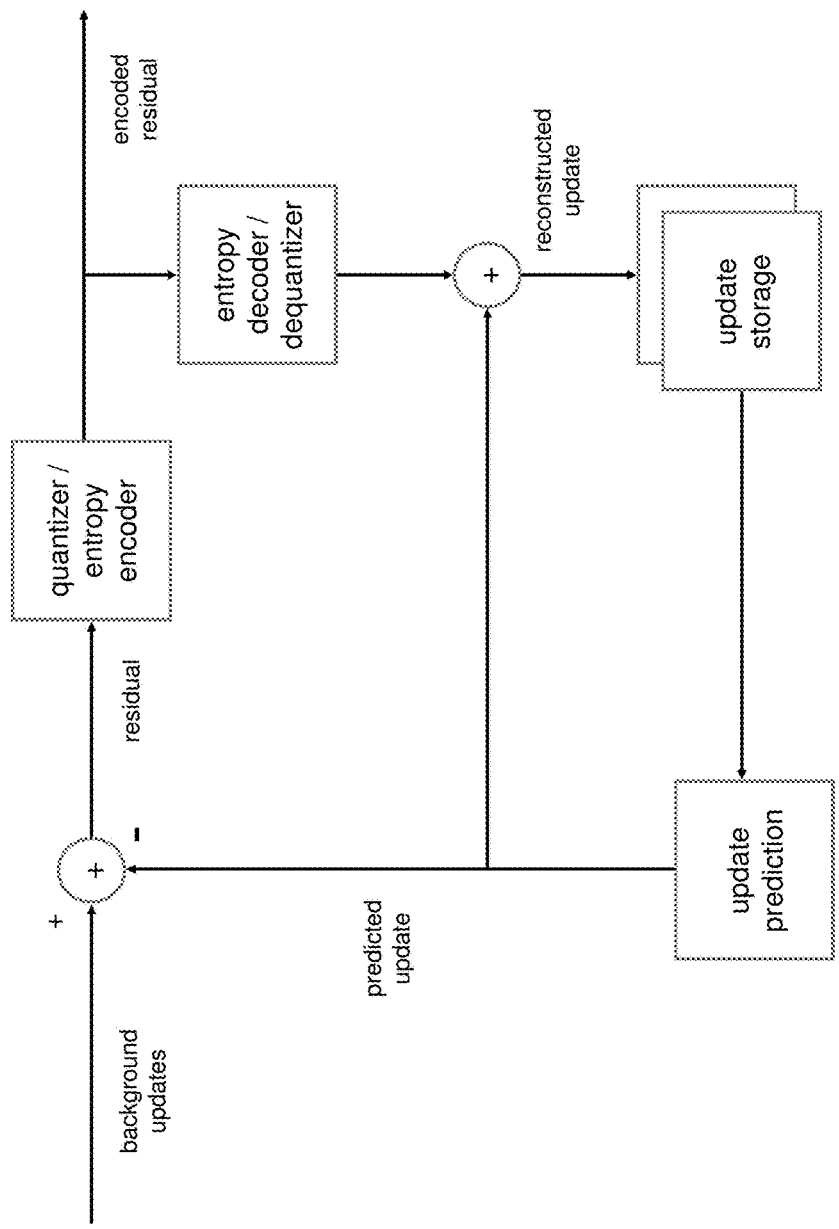
Figure 10: Background Encoder

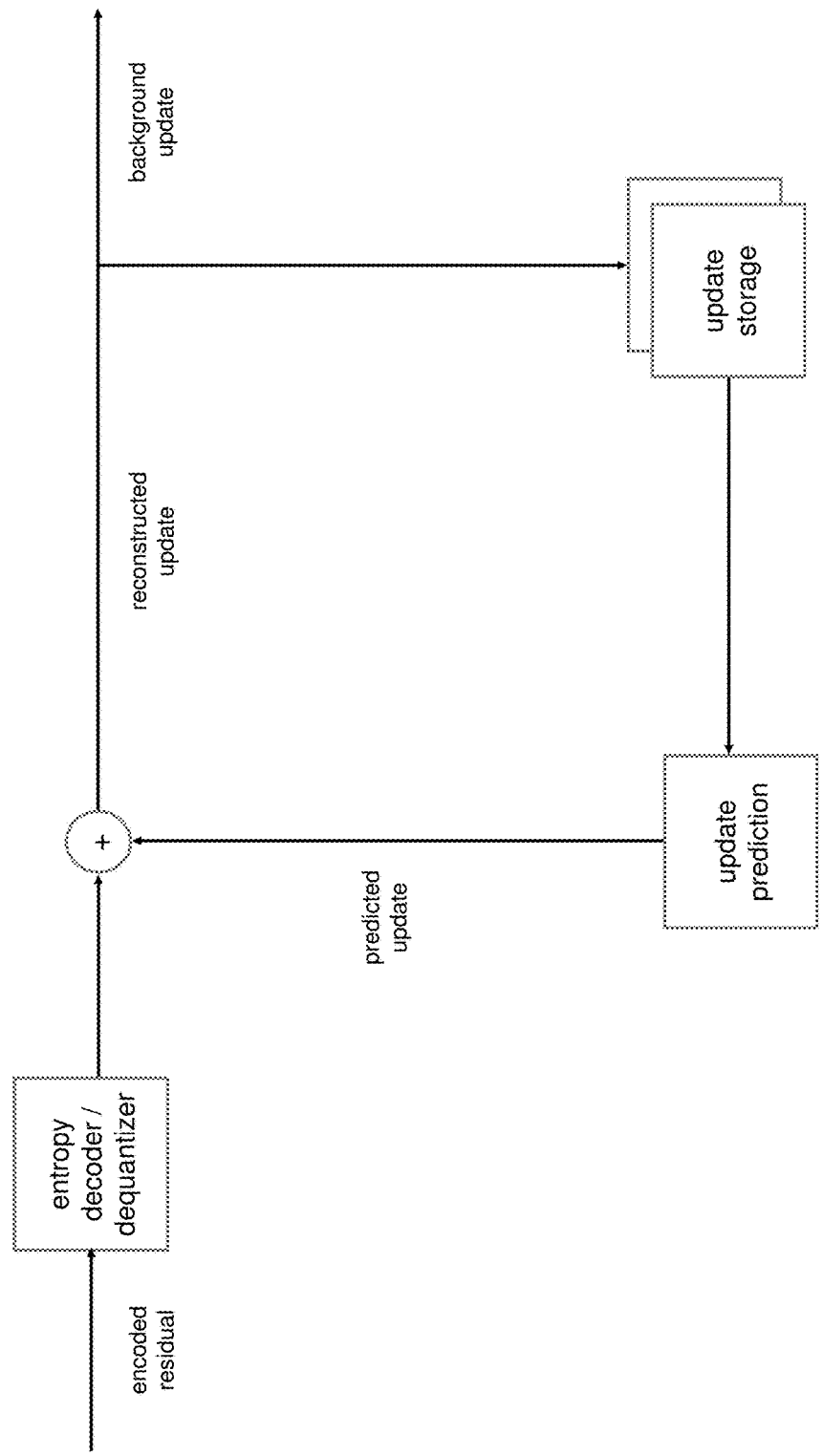
Figure 11: Background Decoder

VIDEO TRANSMISSION BASED ON INDEPENDENTLY ENCODED BACKGROUND UPDATES

This application is a continuation-in-part of U.S. patent application Ser. No. 14/603,212, filed on Jan. 22, 2015.

BACKGROUND OF THE DISCLOSURE

The present disclosure relates in general to video transmission. Specifically, the present disclosure relates to apparatus and methods for alleviating bandwidth limitations of video transmission and enhancing the quality of videos at a receiver. More specifically, improved video transmission systems and methods are provided for generating high-resolution videos at a receiver based on independently encoded background and background updates.

Real-time video communications systems and the emerging field of telepresence are facing an intrinsic challenge as they seek to simulate the experience of being present in another physical space to remote users. This is because the human eye remains vastly superior over its field of view with its ability to fixate its high-resolution fovea on objects of interest, compared to commercially available single-lens cameras with their current state-of-art resolution. See, http://www.clarkvision.com/imagedetail/eye-resolution.html (estimating the resolution of the human eye to be 576 megapixels over 120 degrees). In addition, telepresence systems are limited in practice by the network bandwidth available to most users. It is not surprising, therefore, that telepresence has seen limited uptake outside of single person-to-person video chat using the narrow field of view cameras found in most tablets, phones, and laptops.

Automated and manual pan-tilt-zoom (PTZ) cameras in commercial telepresence systems has attempted to overcome the limitation of single lens camera resolution by optically and mechanically fixating the field of view on select parts of interest in a scene. This partially alleviates the resolution limitations, but has several drawbacks. For example, only one mechanical fixation is possible at a given time; as a result, multiple remote users with different interests may not be satisfactorily served. In addition, the zoom lens and mechanical pan-tilt mechanism drives up the cost of the camera system and posts new challenges on the reliability of the entire system. That is, an automated PTZ system creates higher demands on the mechanics compared to a manual system which typically sustains fewer move cycles through its lifetime. Compared to a stationary camera, the bandwidth-demand for high-quality video encoding also increases significantly. Similarly, some digital PTZ in existing systems present many drawbacks as discussed above, including for example the inability to be controlled by multiple users on the far end and the higher bitrate requirement for video encoding.

Panoramic and ultra-wide angle video cameras may meet the resolution requirements of telepresence systems to deliver desirable user experience. These cameras have the potential for growth in sensor resolution and pixel rate well beyond current standards. This can for instance be enabled by curved sensor surfaces and monocentric lens designs. See, http://www.jacobsschool.ucsd.edu/news/news_releases/release.sfe?id=1418 (discussing a 120 degrees FOV imager capable of resolutions up to at least 85 megapixels); http://image-sensors-world.blogspot.co.il/2014/04/vlsi-symposia-sony-presents-curved.html (a sensor manufacturer announcing prototypes of curved image sensors). However, such designs will put a great strain on the capacity of current networks and video encoding efficiency and thereby render them impractical for broad real-world deployment. For example, a video camera of 85 megapixels at 30 frames per second would require a compression down to 0.0002 bit/pixel to fit into a 10 Mbit/s link. This is generally out of reach today, considering the current video compression standards like H.264 which operates at 0.05 bit/pixel under good conditions.

Therefore, there is a need for improved methodologies and systems to alleviate bandwidth limitations of video transmission and to generate high-resolution videos based on conventional camera hardware. There is a further need to utilize these improvements to enable modern real-time communication systems and desirable telepresence experiences.

SUMMARY OF THE VARIOUS EMBODIMENTS

It is therefore an object of this disclosure to provide methods and systems for alleviating bandwidth limitations on video transmission, thereby generating wide-angle, high-resolution videos using conventional hardware equipment.

Particularly, in accordance with this disclosure, there is provided, in one embodiment, a method for transmitting a video that comprises 1) initializing a background model by determining from the video a static background of the scene; and 2) transmitting a background of the scene as the background model by encoding the background model independently from the video. The background model is incrementally updated, and the update is further encoded and transmitted independently from the video.

In another embodiment, the method further comprises producing an enhanced video at a receiver by merging the background with the video. In yet another embodiment, the background model is updated and transmitted at a bitrate lower than the bitrate of the video. In a further embodiment, the method further comprises transmitting a geometric mapping between the background and the video for each frame.

In another embodiment, the method further comprises determining the field of view of the video by scene analysis. In yet another embodiment, the background model is used to suppress noise changes in the background of the video.

According to one embodiment, the method of this disclosure further comprises compressing the video by a standard video codec. In another embodiment, the video codec is one of H.264, H.265, VP8, and VP9. In yet another embodiment, the background is transmitted in an auxiliary data channel defined by one of H.264, H265, VP8, and VP9

According to another embodiment, the background model is a parametric model. In a further embodiment, the parametric model is Mixture of Gaussians (MOG).

According to yet another embodiment, the background model is a non-parametric model. In a further embodiment, the non-parametric model is Visual Background Extractor (ViB).

In accordance with another embodiment of this disclosure, there is provided a method for simulating pan-tilt-zoom operations on a video of a scene that comprises 1) initializing a background model by determining from the video a static background of the scene; 2) transmitting a background of the scene as the background model by encoding the background model independently from the video, wherein the background model is incrementally updated, wherein the update is further encoded and transmitted independently from the video, and wherein a geometric mapping between the background and the video is transmitted for each frame; and 3) selecting one or more field of view of the video by scene analysis; and producing an enhanced video at a receiver by merging the background with the video.

In another embodiment, the method further comprises controlling the simulated pan-tilt-zoom operations at the receiver. In yet another embodiment, the method further comprises controlling the simulated pan-tilt-zoom operations at a transmitter of the video.

In accordance with yet another embodiment of this disclosure, there is provided a system for transmitting a video of a scene that comprises 1) a transmitter that comprises an outer encoder and a core encoder, wherein the outer encoder is adapted to receive the video and output separately a salient video and a background and geometry bitstream into the core encoder, wherein the core encoder is adapted to output an encoded bitstream; and 2) a receiver that comprises a core decoder, wherein the core decoder is adapted to receive the encoded bitstream and output the salient video.

In accordance with a further embodiment of this disclosure, there is provided a system for transmitting a video of a scene that comprises 1) a transmitter that comprises an outer encoder and a core encoder, wherein the outer encoder is adapted to receive the video and output separately a salient video and a background and geometry bitstream into the core encoder, wherein the core encoder is adapted to output an encoded bitstream; and 2) a receiver that comprises a core decoder and an outer decoder, wherein the core decoder is adapted to receive said encoded bitstream and output separately the salient video and the background and geometry bitstream into the outer decoder, wherein the outer decoder is adapted to merge the salient video and the background and geometry bitstream thereby outputting an enhanced video of the scene.

In another embodiment, the outer encoder further comprises a background estimation unit, which is adapted to initialize a background model by determining from the video a static background of the scene, and to incrementally update the background model at a bitrate lower than the bitrate of the video. In yet another embodiment, the outer encoder further comprises a background encoder connected to the background estimation unit. The background encoder is adapted to encode the background model and the update independently from the video. In a further embodiment, the background encoder comprises an entropy encoder, an entropy decoder, an update prediction unit, and an update storage unit.

According to anther embodiment, the background encoder is connected downstream to a bitstream multiplexer. In yet another embodiment, the outer encoder further comprises a saliency framing unit, adapted to output a geometry bitstream into the bitstream multiplexer. The bitstream multiplexer is adapted to merge the geometry bitstream and the background bitstream thereby outputting a background and geometry bitstream.

In a further embodiment, the outer encoder further comprises a downscale unit capable of scaling and cropping the video. The downscale unit is connected downstream to a noise rejection unit. The noise rejection unit is adapted to suppress noise in the salient video based on the background model.

According to another embodiment, the outer decoder further comprises i) a bitstream demultiplexer adapted to receive the background and geometry bitstream from the core encoder and to output separately the geometry bitstream and the background bitstream, ii) a background decoder connected to the bitstream demultiplexer and adapted to receive the background bitstream, and iii) a background merge unit connected downstream to the bitstream demultiplexer and the background decoder. The background merge unit is adapted to receive the salient video from the core decoder and merge the geometry bitstream and the background bitstream with the salient video thereby producing an enhanced video of the scene.

In yet another embodiment, the background decoder comprises an entropy decoder, an update prediction unit, and an update storage unit.

In a further embodiment, the outer decoder further comprises a virtual pan-tilt-zoom unit capable of receiving control input thereby producing an enhanced video.

According to another embodiment, the core encoder in the system of the present disclosure is an H.264/H.265 video encoder, and the background and geometry bitstream is carried through the H.264/H.265 video encoder's network abstraction layer. In yet another embodiment, the core decoder in the system of this disclosure is an H.264/H.265 video decoder, and the background and geometry bitstream is carried through the H.264/H.265 video decoder's network abstraction layer.

In a further embodiment, the core encoder is in a multimedia container format, and the background and geometry bitstream is carried through an auxiliary data channel of the core encoder. In another embodiment, the core decoder is in a multimedia container format, and the background and geometry bitstream is carried through an auxiliary data channel of the core decoder.

According to yet another embodiment, the core encoder in the system of the present disclosure is a standard video encoder, and the background and geometry bitstream is carried through an auxiliary data channel of the core encoder. In a further embodiment, the core decoder is a standard video decoder, and the background and geometry bitstream is carried through an auxiliary data channel of the core decoder.

In accordance with another embodiment of this disclosure, there is provided a method for transmitting and rendering a video of a scene from multiple fields-of-view that comprises: (1) initializing a three-dimensional background model by determining from the video a static background of the scene; (2) transmitting a background of the scene as the background model by encoding the background model independently from the video, wherein the background model is incrementally updated, and wherein the update is further encoded and transmitted independently from the video; and (3) rendering an augmented video at a receiver by merging the background with the video.

In yet another embodiment, the receiver is a VR/AR device. In a further embodiment, the method further comprises self-learning a region of interest from view directions of the VR/AR receiver; and transmitting a high-resolution video of the region of interest, wherein the augmented video is created by merging the high-resolution video of the region of interest with the background.

In accordance with another embodiment, there is provided a system for transmitting and rendering a video of a scene from multiple fields-of-view that comprises: (1) a transmitter comprising an outer encoder and a core encoder, wherein the outer encoder is adapted to receive the video and output separately a salient video and a three-dimensional background and geometry bitstream into the core encoder, wherein the core encoder is adapted to output an encoded bitstream; and (2) a VR/AR receiver comprising a core decoder and an outer decoder, wherein the core decoder is adapted to receive the encoded bitstream and output separately the salient video and the background and geometry bitstream into the outer decoder, wherein the outer decoder is adapted to merge said salient video and the background and geometry bitstream thereby rendering an augmented video of the scene. In another embodiment, the three-dimensional background model is incrementally updated.

In yet another embodiment, the outer encoder comprises a background estimation unit, which is adapted to initialize a three-dimensional background model by determining from the video a static background of the scene, and to incrementally update the background model at a bitrate lower than the bitrate of the video.

In a further embodiment, the system further comprises a video source for capturing the scene. In another embodiment, the video source comprises one or more cameras with partly overlapping fields-of-view. In yet another embodiment, the cameras are moving cameras. In a further embodiment, the system is adapted to estimate the moving and still parts of the scene. In another embodiment, the outer encoder comprises a background estimation unit, which is adapted to generate a three-dimensional background model based on the still parts of the scene, and to incrementally update the background model at a bitrate lower than the bitrate of the video.

In a further embodiment, the moving cameras are PTZ cameras. In another embodiment, the VR/AR receiver is adapted to self-learn regions of interest from its view directions, and wherein the one or more PTZ cameras are adapted to capture high-resolution videos of the regions of interest.

BRIEF DESCRIPTION OF THE DRAWINGS

FIG. 1 depicts a video transmission system according to one embodiment of this disclosure.

FIG. 2 depicts an outer encoder of a video transmission system according to another embodiment.

FIG. 3 depicts an outer decoder of a video transmission system according to another embodiment.

FIG. 4 depicts an H.264/H.265 core encoder of a video transmission system according to another embodiment.

FIG. 5 depicts an H.264/H.265 core decoder of a video transmission system according to another embodiment.

FIG. 6 depicts a multimedia container format core encoder of a video transmission system according to another embodiment.

FIG. 7 depicts a multimedia container format core decoder of a video transmission system according to another embodiment.

FIG. 8 depicts a standard video encoder with auxiliary data channel as the core encoder of a video transmission system according to another embodiment.

FIG. 9 depicts a standard video decoder with auxiliary data channel as the core decoder of a video transmission system according to another embodiment.

FIG. 10 depicts a background encoder in a video transmission system according to another embodiment.

FIG. 11 depicts a background decoder in a video transmission system according to another embodiment.

DETAIL DESCRIPTION OF THE VARIOUS EMBODIMENTS

The methods and systems according to the various embodiments of this disclosure employ a background model, based on which a background of the scene in a video is encoded and updated incrementally. The encoded background and the updates are transmitted independently of the video. At a receiver the background may then be merged with the video thereby producing an enhanced, high-resolution video.

Methodology Overview

In one embodiment, for example, video is transmitted of a scene, including both foreground and background. It is compressed by a standard video codec such as H.264. The static background of the scene is transmitted as a background model which is incrementally updated at a lower bitrate than the video. The background model is generated and initialized from a static background of the video based on established surveillance system techniques.

In an alternative embodiment, multiple cameras with partly overlapping fields-of-views are deployed as a video source, which generates one or more synchronized and coordinated video streams for transmission and rendering. Such video source includes moving cameras in certain embodiments. Moving and still parts of the scene are estimated from the video streams, and a three-dimensional background model is thereby generated based on the still parts of the images.

In another embodiment, the field of view of the transmitted video is limited automatically by scene analysis—such as limiting it to human subjects—to better utilize the resolution of the video format. The exact spatial relation between the video and background is transmitted for each frame according to this embodiment.

In a further embodiment, the background model is used to suppress spurious noise in the background of the video. The background model data and other related information is transmitted in auxiliary data channels defined by video standards such as H.264. This background and related data may be ignored and bypassed by decoders which are not set up to interpret data carried through the auxiliary data channels. The system according to this embodiment thus provides the flexibility to integrate with the older and existing legacy systems.

In certain embodiments, at a receiver, output from the background model is merged with the video, thereby producing enhanced video. In a particular embodiment, at the receiver, PTZ operations are simulated on the enhanced video. According to one embodiment, this simulated PTZ operation is controlled at a transmitter or at a receiver. The control is effected by a user or through an automated process at either the transmitter or the receiver according to alternative embodiments.

Background Handling

Some existing video encoders apply foreground-background segmentation where the background is subtracted from the video before encoding, and the background transmitted separately. According to one embodiment of this disclosure, video of both foreground and background are encoded, using a standard video encoder such as H.264 or H.265. In this embodiment, spurious noise in the background is suppressed by comparing incoming video pixels to the predicted pixel states of a background model. Therefore, in this embodiment, the video encoder is presented with a nearly static image in background regions. The background model is transmitted and incrementally updated in an auxiliary channel of the standard codec. The background transmission methods according to this embodiment therefore relax the bandwidth requirement on video transmission, and yet enable the rendering of high-resolution videos at a receiver by merging the background updates with the video.

According to one embodiment, the video is decoded by a standard decoder with no knowledge of the background model data. The standard decoder ignores the unknown auxiliary fields and bypasses the background model data. The system of this embodiment utilizes the existing core video codec, which provides a lower cost of implementation. The system of this embodiment thus provides backwards compatibility with the older and existing systems.

In another embodiment, the system and methods of this disclosure transmit the background at an enhanced level of representation relative to the foreground. In a particular embodiment, the background data is transmitted at a higher resolution and higher dynamic range. This is advantageous for a number of reasons. For example, while it would be possible to modify a conventional hybrid video codec to transmit high resolution intra frames and transmit prediction frames at a low resolution, the intra frames may require many bits to encode and therefore not possible to transfer in a low-latency implementation without disruption of the video stream. With background transmission in an outer layer according to this embodiment, core video transmission proceeds normally without disruption as a background transmission is being completed.

Compared to high resolution intra frames, according to this embodiment the core encoder can be kept simpler with background transmission in an outer layer. This provides cost savings and broad system compatibility.

Simulated Pan-Tilt-Zoom

According to another embodiment, as discussed above the system of this disclosure simulates PTZ operations. In this embodiment, the view is determined by a simulated PTZ process on the receiving side as opposed to be fixed on the transmitting side. Therefore, all receiving users are able to access different views of the other side. Because this simulated PTZ is not constrained by mechanics, it is open for numerous additional transitions and transformations in further embodiments. Particularly in one embodiment, instantaneous switching between views and rolling of the view are provided.

These non-mechanical, simulated PTZ systems according to this disclosure provide cost savings as well, and further enhance reliability of the teleprecense compared to the existing PTZ telepresence solutions.

Apparatus and Components

Referring to FIG. 1, the system of this disclosure in one embodiment comprises a video source, a transmitter, and a receiver. In a particular embodiment the video source, the transmitter and the receiver each are panoramic.

The panoramic video source according to one embodiment is a device that provides a wide angle or panoramic digital video stream. In this embodiment it supplies uncompressed video with high bitrate suitable for further processing. The video source in one embodiment is a single lens and image sensor assembly; in another embodiment it includes multiple lenses and sensors along with suitable image stitching software or hardware which can emulate the operation of a single lens and sensor. In yet another embodiment, the video source includes a graphics rendering device which simulates the geometric projection of a three-dimensional (3D) scene to a surface. The system of this embodiment may therefore be advantageously deployed for computer video games.

The geometric projection of the panoramic video source in one embodiment may differ from the desired rendering projection. It may thus be calibrated during the design, manufacture or setup of the video source device in a form suitable for embedding into the video source transmitter, or being forwarded as side information to the video transmitter. The transmitter in turn provides this information to the receiver, which may then be used to render the video with another projection. The system of this embodiment therefore provides considerable flexibility in rendering the video at a receiver based on desired control, either built-in by design or input from a user. Such control may be effected from the transmitter or the receiver in alternative embodiments.

The transmitter of the system according to one embodiment comprises an outer encoder. Referring to FIG. 2, the outer encoder takes in a panoramic digital video stream in one embodiment and outputs a salient video stream, a sequence of encoded background model updates, and geometric projection data. This data from the outer encoder is then passed on to a core encoder of the system according to one embodiment. The video stream is in uncompressed form in a certain embodiment, and is suitable for compression by a standard video encoder. The encoded background model data and geometric projection data according to another embodiment is multiplexed and framed to a format suitable for transmission in the auxiliary data frames of a standard video encoder. The core encoder of the system in this embodiment outputs an encoded bitstream.

The core encoder in one embodiment is a H.264/H.265 encoder, as shown in FIG. 4. The H.264/H.265 core encoder sends auxiliary data in SEI headers marked as user data, using the network abstraction layer of the standard. In a certain embodiment, this data is ignored by receivers not set up to receive such SEI headers. As discussed above, this system provides backward compatibility and facilitates its integration into existing telepresence systems.

The background model employed in the systems of this disclosure according to one embodiment is a parametric model. In such a parametric background model, a number of statistics are determined per pixel based on samples from past video frames. According to another embodiment, the background model is a nonparametric model. In such a nonparametric background model, a number of samples from past video frames is stored or aggregated per pixel—no statistic or parameter is determined in a finite-dimensional space. According to one embodiment, the non-parametric background model is Visual Background Extractor (ViBe). In another embodiment a parametric background model is Mixture of Gaussians (MOG). In certain embodiments of this disclosure, the background model of the system is a three-dimensional model and supports VR/AR applications. For the purpose of various embodiments of this disclosure, the term "three-dimensional" encompasses the scenario where a model is an image from a single viewpoint with depth for each point in the image, which is sometimes referred to as "2.5 dimensional."

The background model of the system according to one embodiment is initialized from pixels in video frames which are known to be background, either by controlling the scene or through bootstrapping using a simpler background model. In an alternative embodiment, the system assumes that all pixels are part of the background at the initialization of the background model.

After initialization, in one embodiment the background model is updated based on the changes in the background from new samples which are determined to be or likely to be background according to the model.

The updates are encoded according to one embodiment by predicting each update from previous reconstructed updates, and transmitting only the difference between the predicted and actual updates, i.e., the residual. The bitrate of the residual is further reduced by quantization and entropy coding in another embodiment.

Referring to FIGS. 10 and 11, updates are reconstructed by the same process in both the background encoder and background decoder according to certain embodiments of this disclosure. The residual is first decoded by inverting the entropy coding and quantization, then each update or set of updates are predicted from previous updates, and the actual updates reconstructed by adding the residual and predicted update.

The transmitter of the system according to one embodiment comprises an outer encoder and a core encoder as shown in FIG. 1. The transmitter and parts thereof are implemented in this embodiment in the same physical device. For example, the transmitter in one embodiment is a mobile system on a chip (SoC). In certain embodiment, the outer encoder is implemented in software for GPU or CPU cores, and the core encoder is implemented using hardware accelerators for video encoding found in such SoCs. This SoC transmitter implementation is advantageous for a telepresence system where mobile phones or tablet devices offers the transmitter utility.

In another embodiment, the transmitter is implemented in a SoC tailored for cameras. Further functionality is implemented as software running on DSP cores, in addition to accelerators for video encoding. The transmitter of this particular embodiment is advantageous for a telepresence system that employs a stand-alone camera.

As discussed above, the video receiver of this disclosure comprises a core decoder. Referring to FIGS. 5, 7, and 9, the core decoder in certain embodiments takes in an encoded bitstream and outputs uncompressed video in addition to the auxiliary data. The auxiliary data includes the background model data and geometric mapping data according to these embodiments. This data is passed on to an outer decoder, as shown in FIG. 3, which merges the salient video and the background model output thereby producing an enhanced panoramic video stream according to one embodiment. In a further embodiment, the outer decoder changes the geometric mapping of the video, thereby simulating the effect of an optical PTZ camera.

In the event the auxiliary data channel between the transmitter and receiver experiences packet loss or other reliability issues, the system of this disclosure in another embodiment provides a utility that sends a request for the transmitter to retransmit the lost packets. These may include parts of the background model data and other transmitted metadata.

The video receiver of the system according to one embodiment is implemented in a cloud service, running on a general purpose data center or media processors. In another embodiment, the receiver is implemented in the web browser of an end user device such as a smartphone, a tablet or a personal computer. In the web browser, the receiver functionality implemented in a particular embodiment by a browser extension, or using standardized web components such as WebRTC (for the core decoder) and WebGL (for the outer decoder). In yet another embodiment, the receiver is implemented as a native application in the operating system of an end user device such as a smartphone, a tablet or a personal computer. In a further embodiment, the receiver is implemented in an appliance dedicated to video communication.

In another embodiment, the receiver is implemented as a part of a virtual reality (VR) or an augmented reality (AR) system, along with immersive eye goggle display, head-mounted tracking, or alternative technologies projecting select images into the retinas of the users. According to this embodiment, the apparatus and method of this invention may alleviate bandwidth limitations of a VR/AR-enabled videoconferencing system where distant live images are projected onto the near-end views.

In a further embodiment, information about the eye-gaze and view direction of a VR/AR receiver is relayed back to the camera system of this invention. High-resolution videos from that particular view direction are accordingly transmitted, allowing certain extra margin around that particular view direction. In yet another embodiment, the system of this invention adapts self-learning to map out the regions of interest. Specifically, the VR/AR receiver analyzes the eye-gaze direction over time, and the regions which receive the most views or "hits" are coded at higher resolution for transmission and rendering.

According to one embodiment the system of this disclosure comprises a video source. The video source includes one or more moving PTZ cameras in certain embodiments. High-resolution videos are captured by these moving PTZ cameras for particular regions of interest ("ROI"), and merged with a background according to one embodiment. The background is a still image in this embodiment and rendered at a higher resolution than the resolution of ROI videos, thereby enhancing the VR/AR experience.

The moving cameras according to one embodiment are synchronized in time and coordinated in location, thereby allowing for efficient blending between ROI videos gathered from multiple cameras.

In another embodiment where a spatially moving camera system is used as the video source, a three-dimensional model of the background is generated in advance using multiple stationary high-resolution cameras with partially overlapping fields of view (FOY). These cameras further comprises a background and foreground segmentation filter in one embodiment, thereby distinguishing moving parts of the scene from non-moving parts. Only the background (still) parts of the scene are used to generate a 3D model of the scene. Techniques of super-resolution imaging are used in an alternative embodiment prior to the generation of the 3D model to increase the 3D model's resolution.

In a further embodiment, a combination of gyros and accelerometers for spatial and angular positioning is applied in a moving camera video source, along with visual information for fine-adjustment. Simultaneous Localization And Mapping (SLAM) techniques are employed, allowing the system of this disclosure to estimate which parts of the scene is moving and which parts are not moving thereby generating a 3D model of the scene.

By way of example, the system in one embodiment determines moving parts of the scene according to the following steps when the camera video source is moving. First, for each consecutive video frame, estimate Harris corner feature points (or other type feature points; for each pair of video frames (both adjacent in time and some pairs with larger time intervals in between), estimate rotation and translation of the camera between frames (with six axis of freedom); and, remove outliers. Some of the outliers are due to noise, and others reflect objects that have moved between frames. Second, for the outlier Harris corners, introduce 3D motion vectors for the parts of the scene that contain the outliers; estimate motion for these points; and, for feature points that are consistently moving together, 3D motion vectors are estimated. A 3D model based on the still parts of the scene is thus generated, taking into account the camera orientation.

The receiver and the transmitter in the system of this disclosure according to certain embodiments are implemented in the same device for two-way video communication.

Application Areas

According to various embodiments, the system of this disclosure may be advantageously deployed in real-time video communication (video conferencing and telepresence), live streaming (sports, concerts, events sharing, and computer gaming), traffic monitoring (dashboard cameras, road monitoring, parking lot monitoring and billing), virtual reality; surveillance, home monitoring; storytelling, movies, news, social and traditional media, and art installations among other applications and industries.

In live-streaming and two-way communication VR/AR-applications where the bandwidth is not large enough to transmit high-resolution video of the entire scene, according to one embodiment high-resolution stills of the whole field of view are transmitted periodically, while high resolution video of selected regions of interest are transmitted with regular frequency. In a further embodiment, the video and stills are blended locally at the VR/AR receiver, thereby archiving fast rendering and low latency for the AR/VR. A typical latency in this context is 20 ms or lower.

The descriptions of the various embodiments provided in this disclosure, including the various figures and examples, are to exemplify and not to limit the invention and the various embodiments thereof.

We claim:

1. A method for transmitting and rendering a video of a scene from multiple fields-of-view, comprising: initializing a three-dimensional background model by determining from said video a static background of said scene; transmitting a background of said scene as said background model by encoding said background model independently from said video, wherein said background model is incrementally updated, and wherein said incremental update is further encoded and transmitted in an auxiliary data channel of a video encoder independently from said video; and, rendering an augmented video at a receiver by merging said incrementally updated background from an auxiliary data channel of a video decoder with said video.

2. The method of claim 1, wherein said receiver is a VR/AR device.

3. The method of claim 2, further comprising self-learning a region of interest from view directions of the VR/AR receiver; and transmitting a high-resolution video of said region of interest, wherein the augmented video is created by merging said high-resolution video of the region of interest with the background.

4. A system for transmitting and rendering a video of a scene from multiple fields-of-view, comprising: i) a transmitter comprising an outer encoder and a core encoder, wherein said outer encoder is adapted to receive said video and output separately a salient video and a three-dimensional background and geometry bitstream into said core encoder, wherein said core encoder is adapted to output an encoded bitstream; and ii) a VR/AR receiver comprising a core decoder and an outer decoder, wherein said core decoder is adapted to receive said encoded bitstream and output separately said salient video and said background and geometry bitstream into said outer decoder, wherein said outer decoder comprises a bitstream demultiplexer is adapted to receive and output said background and geometry bitstream, a background decoder connected to said bitstream demultiplexer and adapted to receive said background and geometry bitstream, and a background merge unit connected downstream to said bitstream demultiplexer and said background decoder, and is adapted to receive said salient video from said core decoder and merge said salient video and said background and geometry bitstream thereby rendering an augmented video of said scene.

5. A system of claim 4, wherein said outer encoder comprises a background estimation unit, said background estimation unit is adapted to initialize a three-dimensional background model by determining from said video a static background of said scene, and to incrementally update said background model at a bitrate lower than the bitrate of said video.

6. A system of claim 4, further comprising a video source for capturing the scene.

7. A system of claim 6, wherein said video source comprises two or more cameras with partly overlapping fields-of-view.

8. A system of claim 7, wherein said cameras are moving cameras.

9. A system of claim 8, further adapted to estimate the moving and still parts of the scene.

10. A system of claim 9, wherein said outer encoder comprises a background estimation unit, said background estimation unit is adapted to generate a three-dimensional background model based on the still parts of the scene, and to incrementally update said background model at a bitrate lower than the bitrate of said video.

11. A system of claim 8, wherein said moving cameras are pan-tilt-zoom (PTZ) cameras.

12. A system of claim 11, wherein said VR/AR receiver is adapted to self-learn regions of interest from its view directions, and wherein said one or more PTZ cameras are adapted to capture high-resolution videos of said regions of interest.

* * * * *